United States Patent
Song et al.

(10) Patent No.: US 11,518,333 B2
(45) Date of Patent: Dec. 6, 2022

(54) DRIVER AIRBAG APPARATUS FOR VEHICLE

(71) Applicant: HYUNDAI MOBIS CO., LTD., Seoul (KR)

(72) Inventors: Min June Song, Seoul (KR); Seok Hoon Ko, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/391,310

(22) Filed: Aug. 2, 2021

(65) Prior Publication Data
US 2022/0063540 A1 Mar. 3, 2022

(30) Foreign Application Priority Data
Aug. 31, 2020 (KR) .......... 10-2020-0110290

(51) Int. Cl.
*B60R 21/203* (2006.01)
*B60R 21/215* (2011.01)
*B60R 11/02* (2006.01)
*B60R 11/00* (2006.01)

(52) U.S. Cl.
CPC ........ *B60R 21/203* (2013.01); *B60R 11/0229* (2013.01); *B60R 21/2035* (2013.01); *B60R 21/215* (2013.01); *B60R 2011/001* (2013.01)

(58) Field of Classification Search
CPC .......... B60R 21/203; B60R 21/215; B60R 21/21656; B60R 21/2346; B60R 21/2165; B60R 21/2035; B60R 21/2037; B60R 21/2176; B60R 21/205; B60R 21/2155; B60R 21/216; B60R 21/261; B60R 21/2334; B60R 11/0229; B60R 11/0235; B60R 11/0258; B60R 11/0264; B60R 2011/001; B60R 2011/005; B60R 2021/23566; B60R 2021/161; B60R 2021/2173
USPC ................... 280/728.2, 731, 728.3
See application file for complete search history.

(56) References Cited

U.S. PATENT DOCUMENTS

2004/0004343 A1* 1/2004 Pinsenschaum ...... B60R 21/216
                                                                 280/728.3
2016/0039382 A1* 2/2016 Surdu .................... B60R 21/20
                                                                 280/728.2

FOREIGN PATENT DOCUMENTS

DE           19911682 A1 *  9/2000 ............. B60R 21/05
KR    10-2012-0044831 A     5/2012
WO    WO-2020260364 A1 * 12/2020 ........... B60R 21/203

* cited by examiner

*Primary Examiner* — Keith J Frisby
(74) *Attorney, Agent, or Firm* — NovoTechIP International PLLC

(57) ABSTRACT

The present invention relates to a driver airbag apparatus for a vehicle, the apparatus having a configuration in which a driver airbag module (20) is mounted on a hub (12) of a steering wheel (10) and a display (30) is mounted on a front side of the airbag module (20), wherein an airbag cover (400) is lift-opened upward by deployment pressure of an airbag cushion (200), an opening angle of the airbag cover (400) is limited by a configuration of an opening angle limiter (500) provided in an airbag housing (100) and the airbag cover (400), and deployment direction of the airbag cushion (200) is controlled by the airbag cover (400) having a limited opening angle so that that airbag cushion may avoid the display (30) and deploy toward the driver through a space (13) between the display (30) and a rim (11) of the steering wheel (10).

13 Claims, 9 Drawing Sheets

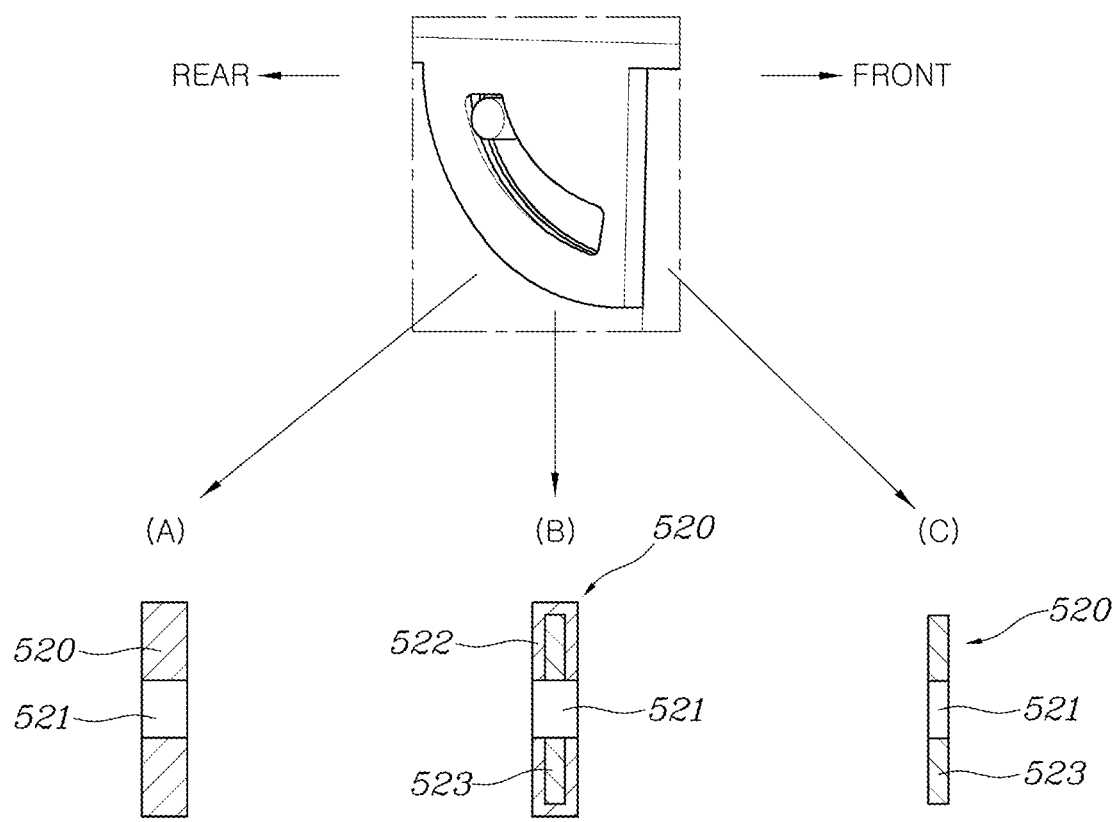

DRIVER AIRBAG APPARATUS FOR VEHICLE

CROSS-REFERENCE TO RELATED APPLICATIONS

The present application claims priority to Korean Patent Application No. 10-2020-0110290, filed Aug. 31, 2020, the entire contents of which is incorporated herein for all purposes by this reference.

BACKGROUND OF THE INVENTION

1. Field of the Invention

The present invention relates to a driver airbag apparatus in which an airbag module and a display are mounted together on a steering wheel, and more particularly, to a driver airbag apparatus for a vehicle that may limit an opening angle of an airbag cover to induce a deployment direction of the airbag cushion when an airbag cushion deploys toward a driver avoiding the display.

2. Discussion of Related Art

As a measure to secure the safety of vehicle passengers, various types of airbag apparatus are provided in vehicles, and among them, a driver airbag apparatus is mounted on a steering wheel.

The driver airbag apparatus is configured to protect an upper body of a driver by an airbag cushion protruding from the steering wheel by the pressure of the airbag gas ejected from the inflator when the inflator receives a control signal of a control unit and explodes.

On the other hand, if the autonomous driving by which a vehicle finds a way to a destination without direct operation of the steering wheel, accelerator pedal, and brake by a driver is widely available, the driver may select a relaxed mode in which the driver may rest without personally engaging in driving while the vehicle travels, and a display device may be provided on the steering wheel for a comfortable rest of the driver in the relaxed mode.

When a display that a driver may gaze at and an airbag module for protecting the driver are mounted together on a steering wheel of a vehicle, a typical structure is that the airbag module including an airbag cushion is fixedly installed on the rim of the steering wheel first and the display is mounted on a front side of the airbag module to face the driver.

Accordingly, the airbag cushion needs to protrude in front of the display and deploy toward the driver when an accident occurs. At this time, the nature of display material makes it impossible for the airbag cushion to tear up the display to protrude, and in particular, when the airbag protrudes while damaging the display, the damaged display will be scattered to injure the driver.

There is a configuration in which the airbag cushion deploys while avoiding the display to prevent injury to the driver by the display at the time of deployment of the airbag cushion. However, a problem is that the driver is not sufficiently protected by the airbag cushion since the airbag cushion that deploys while avoiding the display does not deploy precisely in the direction toward the driver.

Further, when an opening angle of the airbag cover is limited in a structure where the airbag cover opens up by the deployment pressure of the airbag cushion and the airbag cushion deploys through the opened airbag cover, the deploying airbag cushion is subjected to interference from the airbag cover and the deployment direction of the airbag may be controlled toward the driver. The conventional structure uses a fabric tether to limit the opening angle of the airbag cover.

However, a disadvantage of the fabric tether is that the fabric tether lacks the strength to withstand the deployment pressure of the airbag cushion so that the airbag cushion still fails to avoid the display and accurately deploy toward the driver. In particular, the need to additionally provide a separate hook to fix the fabric tether to the airbag housing and airbag cover is another disadvantage which increases the manufacturing cost. That the operation of fixing the tether to the hook is cumbersome and that assembly requires a lot of man-hours add to the disadvantages.

The matters described above as the technical background are intended only for a better understanding of the background of the present invention and should not be taken as an acknowledgment that they pertain to the conventional art already known to those skilled in the related art.

BRIEF SUMMARY OF THE INVENTION

An object of the present invention is to provide a configuration of a driver airbag apparatus for a vehicle mounted on a steering wheel together with a display, such that, when an airbag cushion avoids the display and deploys toward a driver through a space between rims of a steering wheel, deployment direction is controlled by limiting an opening angle of an airbag cover so that the airbag cushion deploys toward a driver. In particular, the opening angle of the airbag cover is limited through a mechanical guide structure provided in the airbag housing and the airbag cover, thereby further strengthening the function of protecting a driver.

To accomplish the above object, according to one aspect of the present invention, the driver airbag apparatus for a vehicle according to the present invention includes: an airbag housing fixed to a steering wheel and provided with an opening on a top side; an airbag cushion housed inside the airbag housing in a folded state and configured to receive airbag gas generated in the inflator and deploy through the opening; an airbag cover coupled to the airbag housing to cover the opening and configured to operate to open the opening while rotating with respect to the airbag housing upon receiving the deployment pressure of the airbag cushion when the airbag cushion deploys; and an opening angle limiter provided in the airbag housing and the airbag cover and assembled with each other to limit an opening angle of the airbag cover.

The display is fixedly installed on the front side of the airbag housing to face a driver; the airbag cover operates to avoid the display and open upward when the airbag cushion deploys; and the deployment direction of the airbag cushion is controlled by the airbag cover that opens upward so that the airbag cushion deploys toward a driver through the space between the display and the rim of the steering wheel.

The airbag cover is formed of a plastic material.

The airbag cover is formed of a plastic material and a steel reinforcement plate is additionally inserted inside so that the airbag cover may withstand deployment pressure of the airbag cushion.

Fastening units provided at a front portion of the airbag housing and a front portion of the airbag cover and assembled with each other to couple the airbag housing and the airbag cover are further included.

The fastening unit includes a housing fastening flange integrally formed at the front portion of the airbag housing;

a cover fastening flange integrally formed at the front portion of the airbag cover to face the housing fastening flange; and a fastening member coupling the housing fastening flange and the cover fastening flange.

The fastening unit includes a housing fastening bracket fixedly coupled to the front portion of the airbag housing; a cover fastening flange integrally formed at the front portion of the airbag cover to face the housing fastening bracket; and a fastening member coupling the housing fastening bracket and the cover fastening flange.

The fastening unit includes a housing fastening bracket fixedly coupled to the front portion of the airbag housing; a cover fastening bracket fixedly coupled to the front portion of the airbag cover; and a fastening member coupling the housing fastening bracket and the cover fastening bracket.

The opening angle limiter includes a housing hook protrusion integrally formed to protrude from the right and left sides of the airbag housing; and a side cover provided on the right and left of the airbag cover to face the right and left sides of the airbag housing and provided with a slit in an arc shape for the housing hook protrusion to pass through, wherein the opening angle of the airbag cover is limited by the contact between the housing hook protrusion and the slit as a movement of the housing hook protrusion is guided by the slit when the airbag cover rotates.

The opening angle limiter includes a housing hook flange integrally formed on the right and left sides of the airbag housing; a side cover provided on the right and left of the airbag cover to face the housing hook flange and provided with a slit in an arc shape; and a hook coupling member fixedly coupled to the housing hook flanges after passing the slit, wherein the opening angle of the airbag cover is limited by the contact between the hook coupling members and the movement of the hook coupling member is guided by the slit when the airbag cover rotates.

The opening angle limiter includes a housing hook bracket fixedly coupled to the right and left sides of the airbag housing; a side cover provided on the right and left of the airbag cover to face the housing hook bracket and provided with a slit in an arc shape, and a hook coupling member fixedly coupled to the housing hook bracket after passing through the slit, wherein the opening angle of the airbag cover is limited by the contact between the hook coupling member and the slit, and the movement of the hook coupling member is guided by the slit when the airbag cover rotates.

The slit formed on the side cover is formed to be slit in an arc shape along an arc formed by a rotation of the airbag cover.

The side cover is formed of a plastic material and integrally formed on the right and left of the airbag cover; and the slit is formed to slit in an arc shape having a radius corresponding to a rotational movement of the airbag cover.

The side cover includes an outer member formed of a plastic material and integrally formed on the right and left of the airbag cover; and a steel plate inserted to be coupled to an inside of the outer member, wherein the slit is formed to integrally pass through the outer member and the steel plate and be slit in an arc shape having a radius corresponding to a rotational movement of the airbag cover.

The side cover is the steel plate fixedly coupled to the right and left of the airbag cover; and the slit passes through the steel plate and is formed to be slit in an arc shape having a radius corresponding to a rotational movement of the airbag cover.

BRIEF DESCRIPTION OF THE DRAWINGS

FIG. 9 is a view for describing a side cover by embodiment according to the present invention.

DETAILED DESCRIPTION OF THE INVENTION

Figure 1:
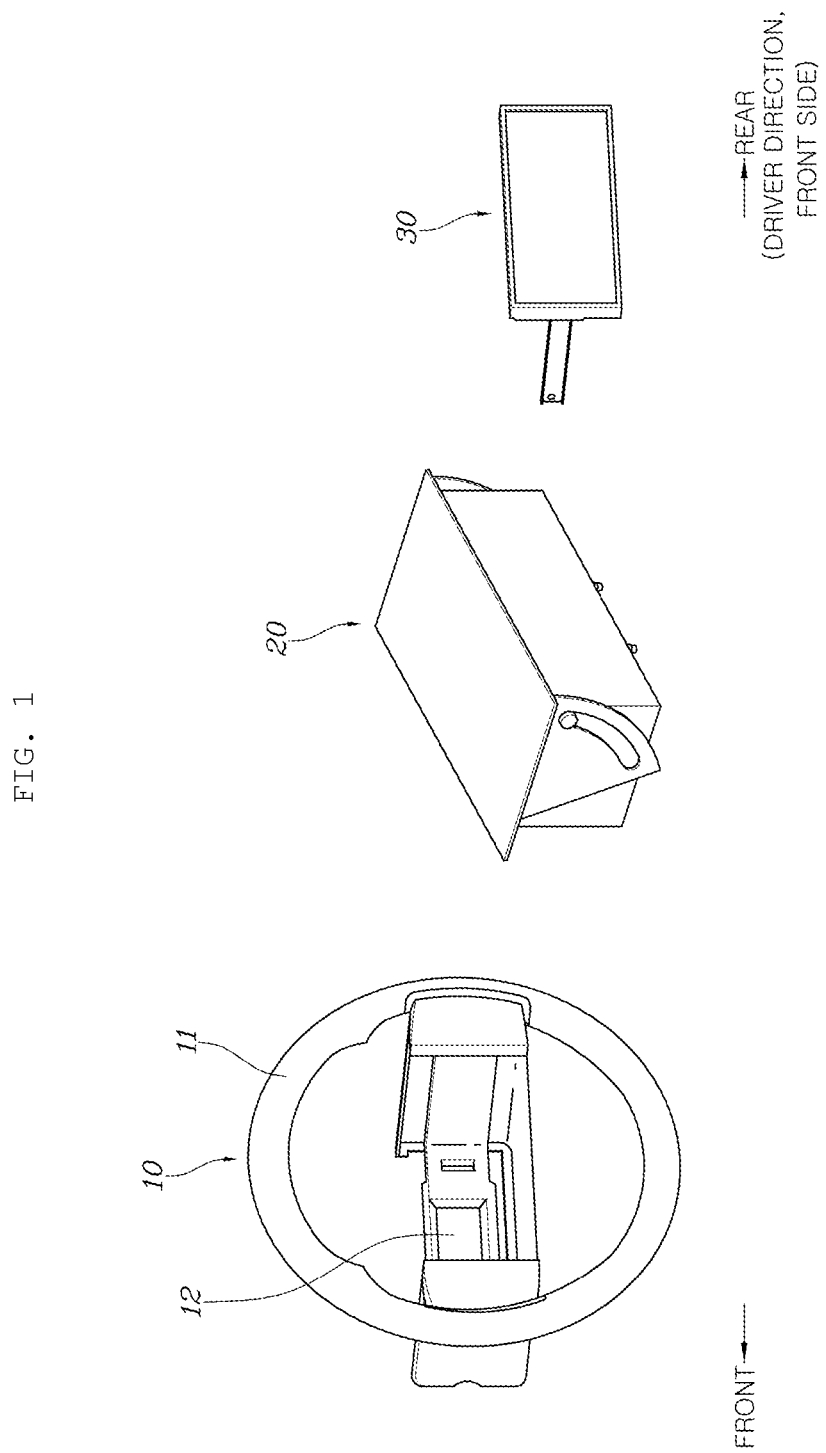
FIG. 1 is a perspective view of a disassembled driver airbag apparatus.

Specific structural or functional descriptions of the embodiments of the present invention disclosed in the present specification or application are presented by way of examples only for the purpose of describing the embodiments according to the present invention, and the embodiments according to the present invention may be implemented in various forms and should not be construed as being limited to the embodiments described in the present specification or application.

Since the present invention may be modified in various ways and have various embodiments, specific embodiments will be illustrated in the drawings and described. However, this is not intended to limit the present invention to the specific embodiments and should be construed as including all modifications, equivalents, and substitutes included in the spirit and technical scope of the present invention.

Terms such as first and/or second may be used to describe various components, but the components should not be limited by the terms. The terms only serve the purpose of distinguishing one component from other components. For example, the first component may be referred to as the second component, and similarly, the second component may also be referred to as the first component without deviating from the scope of the right according to the concept of the present invention. The term and/or includes a combination of a plurality of related items listed or an item among a plurality of related items listed.

When a component is referred to as being "connected" or "coupled" to another component, it may be directly connected or coupled to the another component, but it should be understood that other components may exist in between. On the other hand, when a component is referred to as being "directly connected" or "directly coupled" to another component, it should be understood that there are no intervening components present. Other expressions describing the relationship between components such as "between" and "just between", or "adjacent to" and "directly adjacent to" should be interpreted in the same manner.

The terminology used herein is for the purpose of describing particular embodiments only and is not intended to be limiting of the invention. Singular expressions include plural expressions unless the context explicitly indicates otherwise. In the present specification, terms such as "comprise" or "have" are intended to designate the presence of implemented features, integers, steps, operations, components, parts, or combinations thereof and should not be understood to preclude the presence or additional possibilities of one or more of other features, integers, steps, operations, components, parts or combinations thereof in advance.

Unless otherwise defined, all terms used herein, including technical or scientific terms, have the same meanings as are generally understood by one of ordinary skill in the art. It will be further understood that terms, such as those defined in commonly used dictionaries, should be interpreted as having a meaning that is consistent with their meaning in the context of the present application, and will not be interpreted in an idealized or overly formal sense unless expressly so defined herein.

A control unit (controller) according to an exemplary embodiment of the present invention may be implemented through a processor (not shown) configured to perform operations to be described below using the nonvolatile memory configured to store algorithm configured to control the operations of various components of the vehicle or data on the software commands to reproduce the algorithm, and data stored in the memory. Here, the memory and the process may be implemented in separate chips. Alternatively, the memory and the processor may be implemented in an integrated single chip. The processor may assume a form of one or more processors.

Hereinafter, a driver airbag apparatus according to an embodiment of the present invention will be described with reference to the accompanying drawings.

Figure 2:
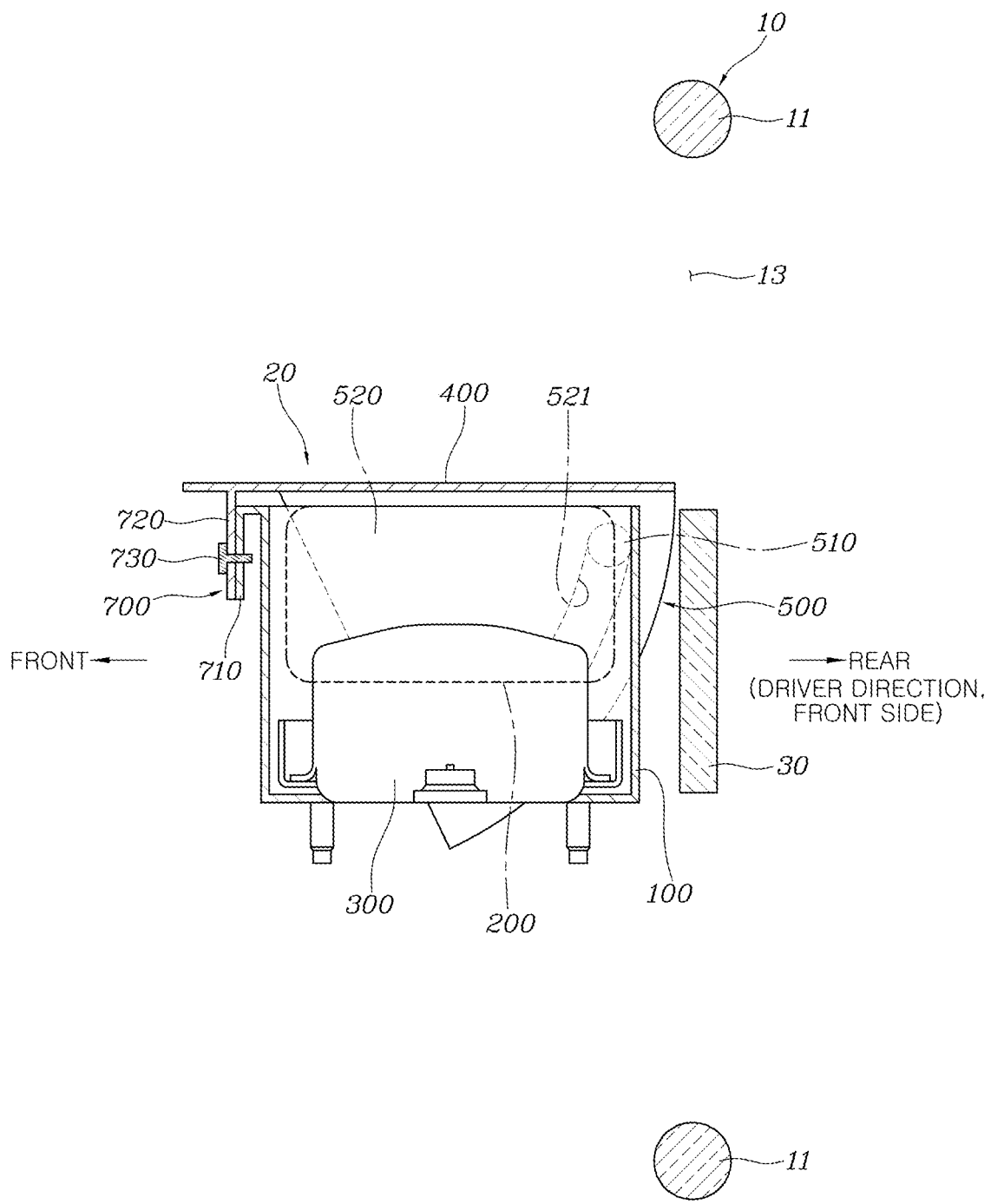
FIG. 2 is a cross-sectional view showing an assembled state of FIG. 1 before an airbag cushion deploys.
Figure 3:
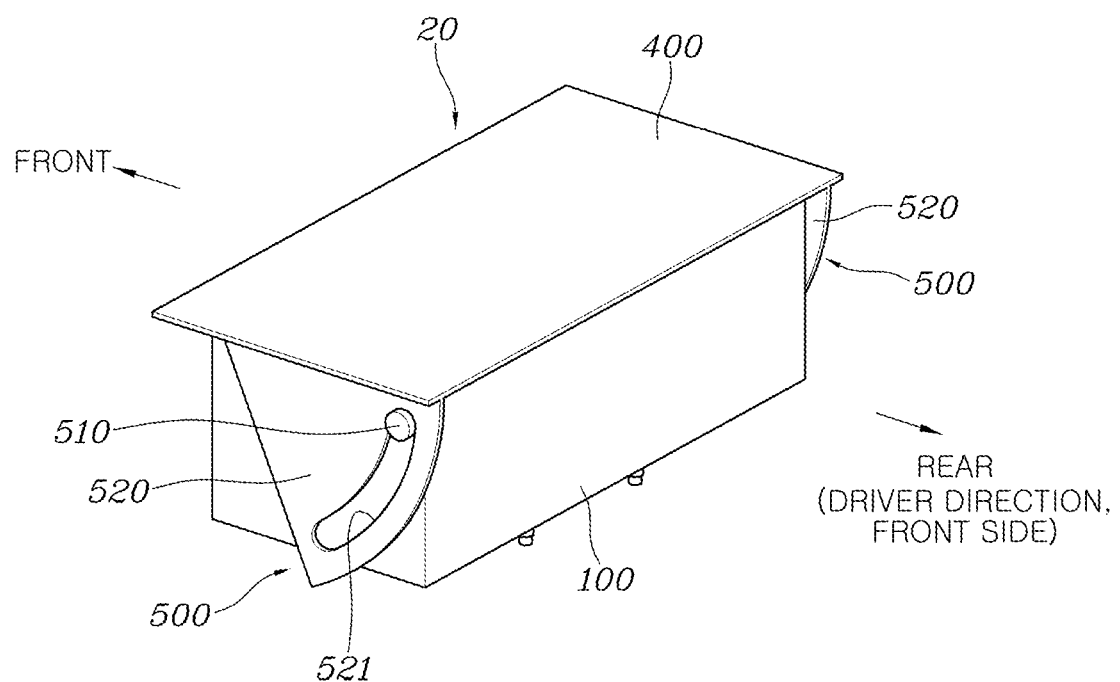
FIG. 3 is a perspective view of an airbag cover prior to opening as in FIG. 2.
Figure 4:
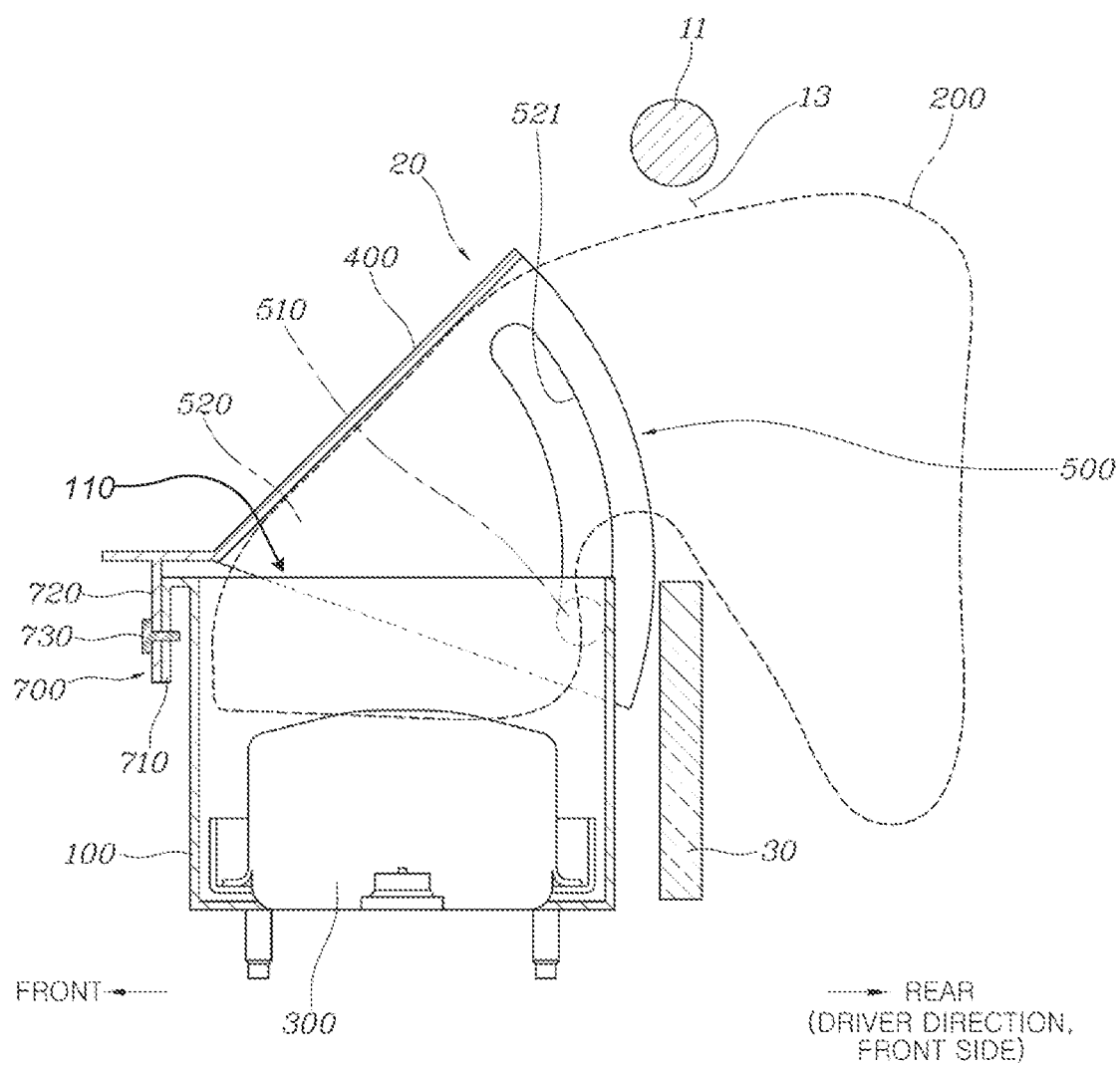
FIG. 4 is a view of an airbag cushion in a deploying state.
Figure 5:
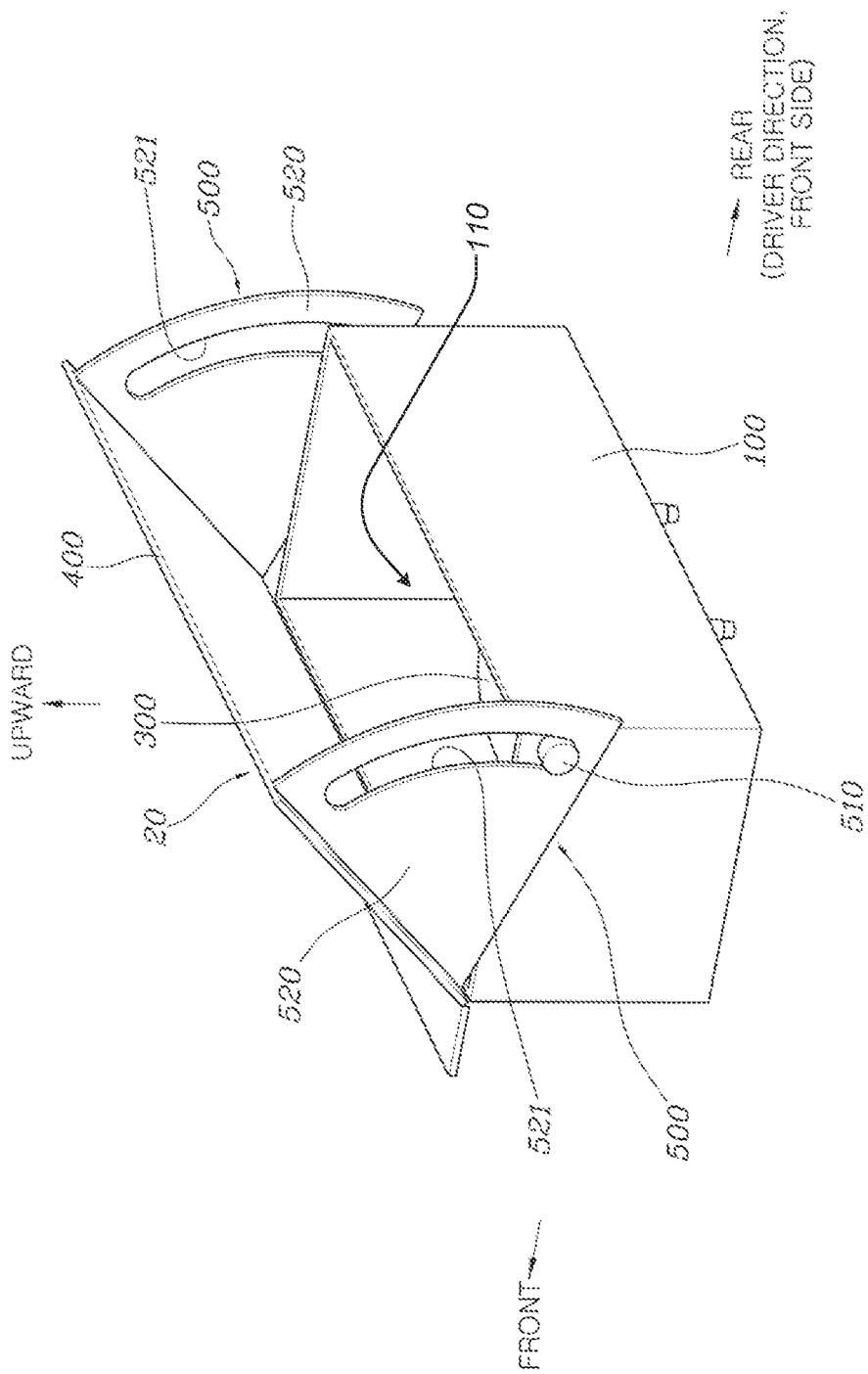
FIG. 5 is a perspective view of an airbag cover in an open state as in FIG. 4.
Figure 6:
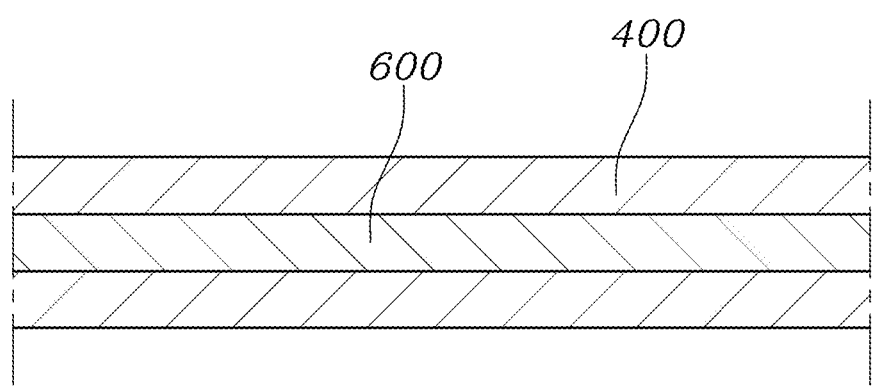
FIG. 6 is a cross-sectional view of an airbag cover with a reinforcement plate inserted according to the present invention
Figure 7:
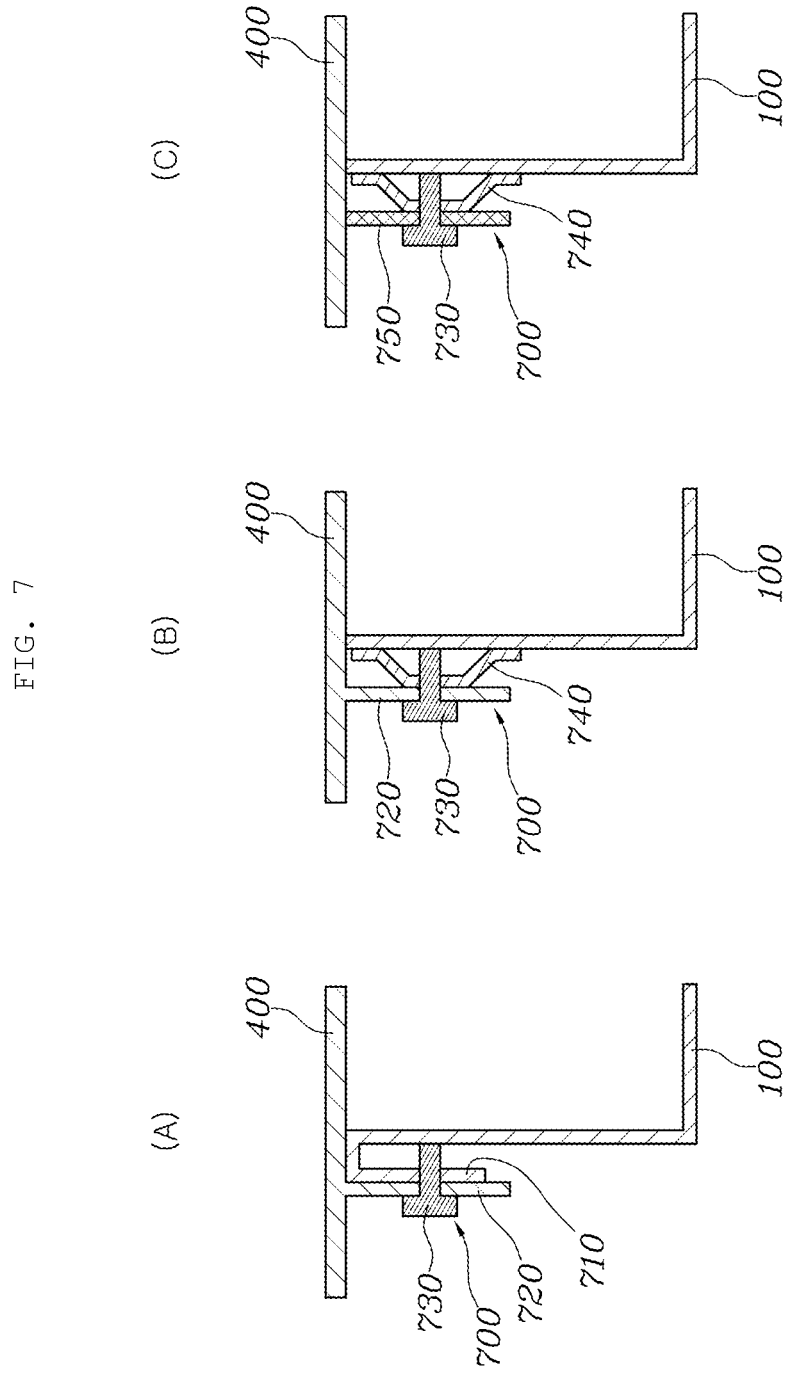
FIG. 7 is a view for describing a fastening unit by embodiment according to the present invention.
Figure 8:
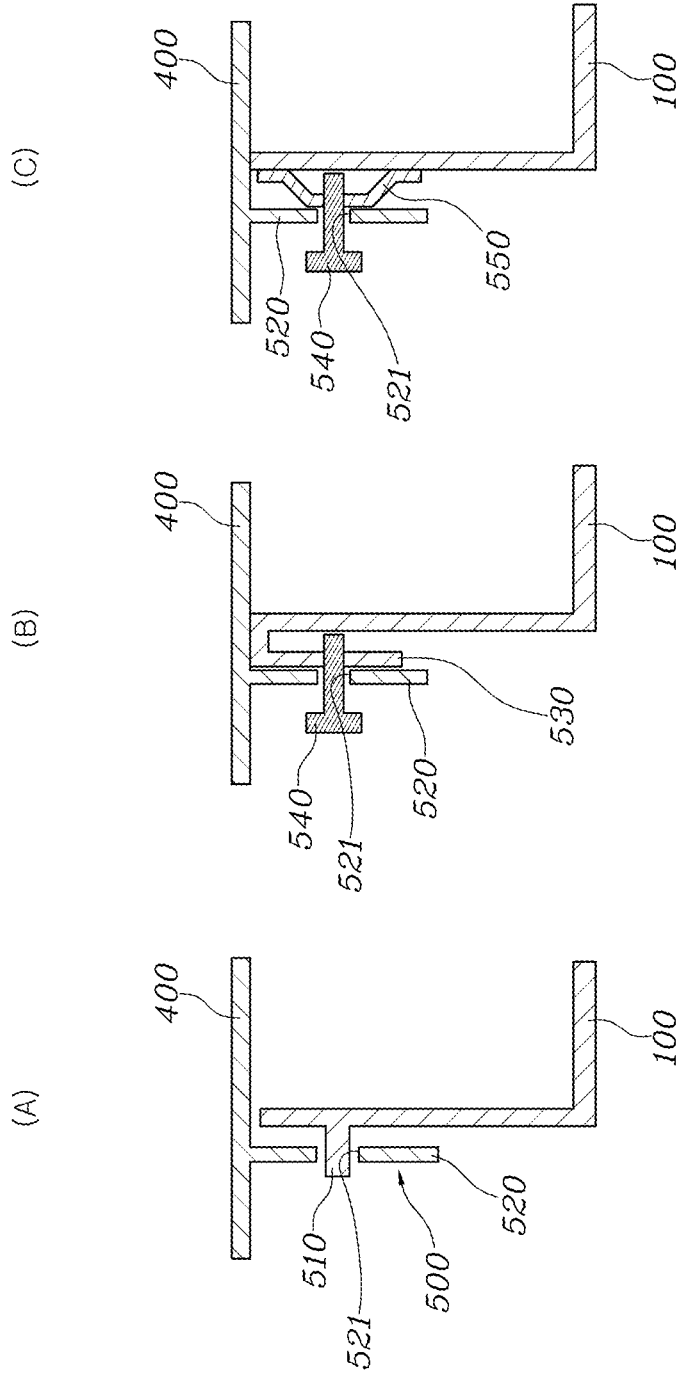
FIG. 8 is a view for describing an opening angle limiter by embodiment according to the present invention.

The driver airbag apparatus according to the present invention basically has a configuration in which an airbag module 20 is mounted on a steering wheel 10 and a display 30 is also mounted on the front side of the airbag module 20 to face a driver as shown in FIGS. 1 to 9.

Considering that the autonomous driving of the vehicle is universally realized, the display 30 that the driver may comfortably watch in a relaxed mode is mounted on the steering wheel 10 to face the driver.

When the driver airbag module 20 and the display 30 are mounted together on the steering wheel 10 of the vehicle, the display 30 is positioned on the front side facing the driver, the airbag module 20 is positioned behind the display 30, and the airbag cushion 200 constituting the airbag module 20 avoids the display 30 and deploys toward the driver at the time of deployment.

Accordingly, there is an advantage that damage to the display 30 by the deploying airbag cushion 200 may be prevented, and further, an injury to the driver by the display 30 may be prevented when the airbag cushion 200 deploys.

The steering wheel 10 of the vehicle largely includes a rim 11 gripped by the driver with hands and a hub 12 (base) in the center.

The driver airbag module 20 according to the present invention is fixedly mounted on the hub 12 of the steering wheel 10, and the display 30 is mounted on the front side of the airbag module 20 to face the driver.

In the embodiment of the present invention, the direction toward the rear of the vehicle is the direction toward the driver and also the front side.

Accordingly, when the driver gazes at the steering wheel 10, the display 30 is visible on the front side. Since the driver airbag module 20 is positioned behind the display 30, the airbag module 20 is not visible in the driver's sight.

The driver airbag module 20 includes an airbag housing 100 fixed to the hub 12 of the steering wheel 10 and provided with an opening 110 on a top side; an airbag cushion 200 housed in the airbag housing 100 in a folded state; an inflator 300 fixed to the airbag housing 100 to generate airbag gas for the deployment of the airbag cushion 200 at the time of an explosion or an ignition; an airbag cover 400 coupled to the airbag housing 100 to cover the opening 110 and configured to operate to open the opening 110 while rotating with respect to the airbag housing 100 upon receiving deployment pressure of the airbag cushion 200 when the airbag cushion 200 deploys; and an opening angle limiter 500 provided in the airbag housing 100 and the airbag cover 400 and assembled with each other to limit the opening angle of the airbag cover 400.

The display 30 is positioned on the front side facing the driver with respect to the airbag housing 100, and the display 30 is fixedly mounted on the hub 12 of the steering wheel 10.

Accordingly, if an accident occurs while the vehicle travels and the inflator 300 explodes or ignites by a control signal of an airbag control unit to generate airbag gas, the airbag cushion 200 deploys by the pressure of the airbag gas, the airbag cover 400 operates to open by the deployment pressure of the deploying airbag cushion 200 avoiding the display 30, the deployment direction of the airbag cushion 200 is controlled by the airbag cover 400 opening upward so that the airbag cushion deploys toward the driver through the space 13 between the display 30 and the rim 11 of the steering wheel 10, thereby preventing damage to the display 30 by the deploying airbag cushion 200 and, through this, preventing an injury to the driver by the display 30 when the airbag cushion 200 deploys.

The airbag cover 400 according to the present invention opens up in the direction where the display 30 is avoided, that is, upward when the airbag cushion 200 deploys, and the open airbag cover 400 serves to control the deployment direction of the airbag cushion 200 so that the airbag cushion 200 avoids the display 30 and deploys toward the driver.

According to the embodiment of the present invention, as shown in the drawings, based on the aligned state of the steering wheel 10 with no rotation of (state in which drive wheels face forward since the steering wheel is not rotated), the airbag cover 400 avoids the display 30 and opens upward, and the deployment direction of the airbag cushion 200 is controlled by the open airbag cover 400 so that the airbag cushion 200 deploys toward the driver through the space 13 between the display 30 and the rim 11 of the steering wheel 10.

In another embodiment although not shown in the drawings, based on the aligned state of the steering wheel 10 with no rotation, the airbag cover 400 may avoid the display 30 and open up in either downward direction or lateral direction. Even in this case, the deployment direction of the airbag cushion 200 is controlled by the open airbag cover 400 so that the airbag cushion 200 deploys toward the driver through the space 13 between the display 30 and the rim 11 of the steering wheel 10.

The airbag cover 400 for guiding the deployment direction of the airbag cushion 200 is preferably formed of a plastic material, and, if necessary, a steel reinforcement plate 600 may be additionally inserted to withstand the deployment pressure of the airbag cushion 200.

The airbag module 20 according to the present invention further includes a fastening unit 700 provided at the front portion of the airbag housing 100 and the front portion of the airbag cover 400 and assembled with each other to couple the airbag housing 100 and the airbag cover 400.

The fastening unit 700 according to a first embodiment of the present invention may include a housing fastening flange 710 integrally formed at the front portion of the airbag housing 100, a cover fastening flange 720 integrally formed at a front portion of the airbag cover 400 to face the housing fastening flange 710, and a fastening member 730 coupling the housing fastening flange 710 and the cover fastening flange 720 as shown in FIG. 7A.

Any one of a bolt, a screw, and a rivet may be used as the fastening member 730.

A fastening unit 700 according to a second embodiment may include a housing fastening bracket 740 fixedly coupled to the front portion of the airbag housing 100, a cover fastening flange 720 formed at the front portion of the airbag cover 400 to face the housing fastening bracket 740, and a fastening member 730 coupling the housing fastening bracket 740 and the cover fastening flange 720 as shown in FIG. 7B.

A fastening unit 700 according to a third embodiment may include a housing fastening bracket 740 fixedly coupled to the front portion of the airbag housing 100, a cover fastening bracket 750 fixedly coupled to the front portion of the airbag cover 400, and a fastening member 730 coupling the housing fastening bracket 740 and the cover fastening bracket 750 as shown in FIG. 7C.

The cover fastening flange 720 may be formed of plastic, and the housing fastening bracket 740 and the cover fastening bracket 750 may be formed of steel.

The opening angle limiter 500 according to the first embodiment of the present invention, as shown in FIGS. 2 to 5 and FIG. 8A, is provided with a housing hook protrusion 510 integrally formed to protrude on the right and left sides of the airbag housing 100 and a slit or slot hole 521 provided on the right and left of the airbag cover 400 to face the right and left sides of the airbag housing 100 and slit in an arc shape are formed, wherein a side cover 520 in which the slit 521 passes through the housing hook protrusion 510 may be included and the opening angle of the airbag cover 400 is limited by the contact between the housing hook protrusion 510 and the slit 521 as the movement of the housing hook protrusion 510 is guided by the slit 521 when the airbag cover 400 rotates.

The opening angle of the airbag cover 400 may be appropriately tuned to the desired angle by tuning the shape of the housing hook protrusion 510 or the shape and length of the slit 521.

The slit 521 formed in the side cover 520 is formed to be slit extending in an arc shape having a radius corresponding to a rotational movement of the airbag cover 400.

As shown in FIG. 8B, the opening angle limiter 500 according to the second embodiment may include a housing hook flange 530 integrally formed on the right and left sides of the airbag housing 100, a side cover 520 provided on the right and left of the airbag cover 400 to face the housing hook flange 530 and provided with slit 521 slit in an arc shape, and a hook coupling member 540 fixedly coupled to the housing hook flange 530 after passing through the slit 521, wherein the opening angle of the airbag cover 400 is limited by the contact between the hook coupling member 540 and the slit 521 as the movement of the hook coupling member 540 is guided by the slot hole 521 when the airbag cover 400 rotates.

Any one of a bolt, a screw and a rivet may be used as the hook coupling member 540.

As shown in FIG. 8C, the opening angle limiter 500 according to the third embodiment may include a housing hook bracket 550 fixedly coupled to the right and left sides of the airbag housing 100, a side cover 520 provided on the right and left of the airbag cover 400 to face the housing hook bracket 550 and provided with a slit 521 slit in an arc shape, and the hook coupling member 540 fixedly coupled to the housing hook bracket 550 after passing through the slit 521, wherein the opening angle of the airbag cover 400 is limited by the contact between the hook coupling member 540 and the slit 521 as the movement of the hook coupling member 540 is guided by the slit 521 when the airbag cover 400 rotates.

On the other hand, as shown in FIGS. 2 to 5 and FIG. 9A, the side cover 520 according to the first embodiment of the present invention may be formed of a plastic material and be integrally formed on the right and left of the airbag cover 400. In this case, the slit 521 is formed to pass through the side cover 520 formed of a plastic material and then be slit in an arc shape having a radius corresponding to a rotational movement of the airbag cover 400.

As shown in FIG. 9B, the side cover 520 according to the second embodiment of the present invention may be formed of a plastic material and include an outer member 522 integrally formed on the right and left of the airbag cover 400 and a steel plate 523 inserted to be coupled to the inside of the outer member 523. In this case, the slot hole 521 is formed to integrally pass through the outer member 522 and the steel plate 523 and then be slit in an arc shape having a radius corresponding to a rotational movement of the airbag cover 400.

The steel plate 523 serves to reinforce the strength so that the side cover 520 or the outer member 522 formed of plastic material may withstand the deployment pressure of the airbag cushion 200.

As shown in FIG. 9C, the side cover 520 according to the third embodiment of the present invention may only include the steel plate 523 fixedly coupled to the right and left of the airbag cover 400. In this case, the slit 521 is formed to pass through the steel plate 523 and then be slit in an arc shape having a radius corresponding to a rotational movement of the airbag cover 400.

As described above, in the driver airbag apparatus according to the embodiments of the present invention, the apparatus having a configuration in which the driver airbag module 20 is mounted on the hub 12 of the steering wheel 10 and the display 30 is mounted on the front side of the airbag module 20 to face the driver, the airbag cover 400 is lift-opened upward by the deployment pressure of the airbag cushion 200, the opening angle of the airbag cover 400 is limited by the configuration of the opening angle limiter 500 provided in the airbag housing 100 and the airbag cover 400, and the deployment direction of the airbag cushion 200 is controlled by the airbag cover 400 having a limited opening angle so that the airbag cushion 200 may avoid the display 30 and deploy toward the driver through the space 13 between the display 30 and the rim 11 of the steering wheel 10, thereby preventing damage to the display 30 by the airbag cushion 200, preventing injury to the driver by the damaged display 30 when the airbag cushion 200 deploys, and deploying the airbag cushion 200 toward the driver more quickly, which contributes to the advantage of further strengthening the protection function of the driver.

In addition, the present invention has the advantage of enabling the airbag cushion 200 to avoid the display 30 and deploy toward the driver more accurately by limiting the opening angle of the airbag cover 400 through the configuration of the opening angle limiter 500 which replaces a fabric tether and has a certain degree of strength. In particular, compared with the operation with a fabric tether, the advantage includes the easier assembly operation and reduced man-hours required for the assembly. In the driver airbag apparatus according to the present invention, the apparatus having a configuration in which the driver airbag module is mounted on a hub of the steering wheel and the display is mounted on the front side of the airbag module to face a driver, the airbag cover is lift-opened upward by the deployment pressure of the airbag cushion, the opening angle of the airbag cover is limited by the configuration of the opening angle limiter provided in the airbag housing and the airbag cover, and the deployment direction of the airbag cushion is controlled by the airbag cover having a limited opening angle so that the airbag cushion may avoid the display and deploy toward the driver through the space between the display and the rim of the steering wheel, thereby preventing damage to the display by the airbag cushion, preventing injury to the driver by the damaged display, and deploying the airbag cushion toward the driver more quickly, which contributes to the effect of further strengthening the protection function of the driver.

In addition, the present invention has the advantage of enabling the airbag cushion to avoid the display and deploy toward the driver more accurately by limiting the opening angle of the airbag cover through the configuration of the opening angle limiter which replaces a fabric tether and has a certain degree of strength. In particular, compared with an operation with a fabric tether, the effect includes easier assembly operation and reduced man-hours required for the assembly.

Specific embodiments of the present invention are illustrated and described, but it will be self-evident to those with common knowledge in the related art that the present invention may be improved upon and modified in various ways within the scope not departing from the technical spirit of the present invention provided by the patent claims below.

In the drive air bag apparatus according to the present invention, the apparatus having a configuration in which the driver air bag module is mounted on a hub of the steering wheel and the display is mounted on the front side of the air bag module to face a driver, the air bag cover is lift-opened upward by the deployment pressure of the air bag cushion, the opening angle of the air bag cover is limited by the configuration of the opening angle limiter provided in the air bag housing and the air bag cover, and the deployment direction of the air bag cushion is led by the air bag cover having a limited opening angle so that the air bag cushion may avoid the display and deploy toward the driver through the space between the display and the rim of the steering wheel, thereby preventing damage to the display by the air bag cushion, preventing injury to the driver by the damaged display, and deploying the air bag cushion toward the driver more quickly, which contributes to the effect of further strengthening the protection function of the driver.

In addition, the present invention has the advantage of enabling the air bag cushion to avoid the display and deploy toward the driver more accurately by limiting the opening angle of the air bag cover through the configuration of the opening angle limiter which replaces a fabric tether and has a certain degree of strength. In particular, compared with an operation with a fabric tether, the effect includes easier assembly operation and reduced man-hours required for the assembly.

What is claimed is:

1. A driver airbag apparatus for a vehicle, comprising:
    an airbag housing connected to a steering wheel and having a top side having an opening;
    an airbag cushion stored folded in the airbag housing and configured to deploy through the opening of the airbag housing when airbag gas is received from an inflator;
    an airbag cover coupled to the airbag housing and covering the opening of the airbag housing and configured to rotate with respect to the airbag housing to expose the opening of the airbag housing when the airbag cushion deploys; and
    an opening angle limiter coupled between the airbag housing and the airbag cover and configured to limit an opening angle of the airbag cover, wherein the opening angle limiter includes:
        a housing hook flange integral with the airbag housing on a side surface of the airbag housing;
        a side cover connected to the airbag cover, facing the side surface of the airbag housing and having a slit extending in an arc-shape; and
        a hook coupling member coupled to the housing hook flange through the slit of the side cover,
        wherein the opening angle of the airbag cover is limited by a contact between the hook coupling member and a portion of the side cover around a bottom end of the slit.

2. The driver airbag apparatus of claim 1, wherein:
    a display is mounted on the steering wheel at a front side of the airbag housing to face a driver,
    the airbag cover is configured to open upward when the airbag cushion deploys and control the airbag cushion to be deployed toward the driver through a space between the display and a rim of the steering wheel.

3. The driver airbag apparatus of claim 1, wherein the airbag cover is formed of a plastic material.

4. The driver airbag apparatus of claim 1, wherein the airbag cover is formed of a plastic material and a steel reinforcement plate.

5. The driver airbag apparatus of claim 1, further comprising a fastening unit provided at a front portion of the airbag housing and a front portion of the airbag cover and configured to couple the airbag housing and the airbag cover.

6. The driver airbag apparatus of claim 5, wherein the fastening unit includes:
    a housing fastening flange integral with the airbag housing at the front portion of the airbag housing;
    a cover fastening flange integral with the airbag cover at the front portion of the airbag cover and facing the housing fastening flange; and
    a fastening member configured to fasten the cover fastening flange to the housing fastening flange.

7. The driver airbag apparatus of claim 5, wherein the fastening unit includes:
    a housing fastening bracket coupled to the front portion of the airbag housing;
    a cover fastening flange integral with the airbag cover at the front portion of the airbag cover and covering the housing fastening bracket; and
    a fastening member configured to fasten the cover fastening flange to the housing fastening bracket.

8. The driver airbag apparatus of claim 5, wherein the fastening unit includes:
    a housing fastening bracket coupled to the front portion of the airbag housing;
    a cover fastening bracket coupled to the front portion of the airbag cover; and
    a fastening member configured to fasten the cover fastening bracket to the housing fastening bracket.

9. The driver airbag apparatus of claim 1, wherein the opening angle limiter includes a side cover connected to the airbag cover, facing a side surface of the airbag housing, and having a slit extending in an arc-shape having a radius corresponding to a rotational movement of the airbag cover.

10. The driver airbag apparatus of claim 1, wherein:
the opening angle limiter includes a plastic side cover integrally formed with the airbag cover and facing a side surface of the airbag housing, and
the side cover has a slit extending in an arc-shape having a radius corresponding to a rotational movement of the airbag cover.

11. The driver airbag apparatus of claim 1, wherein the opening angle limiter includes a side cover connected to the airbag cover, the side cover comprising:
a plastic outer member integral with the side cover;
a steel plate positioned within the outer member; and
a slit at the outer member and the steel plate and extending in an arc-shape having a radius corresponding to a rotational moment of the airbag cover.

12. The driver airbag apparatus of claim 1, wherein the opening angle limiter includes a side cover connected to the airbag cover, the side cover comprising:
a steel plate; and
a slit at the steel plate and extending in an arc-shape having a radius corresponding to a rotational movement of the airbag cover.

13. A driver airbag apparatus for a vehicle, comprising:
an airbag housing connected to a steering wheel and having a top side having an opening;
an airbag cushion stored folded in the airbag housing and configured to deploy through the opening of the airbag housing when airbag gas is received from an inflator;
an airbag cover coupled to the airbag housing and covering the opening of the airbag housing and configured to rotate with respect to the airbag housing to expose the opening of the airbag housing when the airbag cushion deploys; and
an opening angle limiter coupled between the airbag housing and the airbag cover and configured to limit an opening angle of the airbag cover, wherein the opening angle limiter includes:
a housing hook bracket coupled to a side surface of the airbag housing;
a side cover connected to the airbag cover, facing the side surface of the airbag housing and having a slit extending in an arc-shape; and
a hook coupling member coupled to the housing hook bracket through the slit,
wherein the opening angle of the airbag cover is limited by a contact between the hook coupling member and a portion of the side cover around a bottom end of the slit.

* * * * *